Patented Oct. 13, 1953

UNITED STATES PATENT OFFICE 2,655,461

2,655,461
COMPLEX ZINC- AND SILVER-AMMONIA SALTS OF ALKENYL SUCCINIC ACIDS, METHODS FOR PREPARING THEM, AND METHOD FOR COMBATING FUNGI THEREWITH

Mearl A. Kise, Portsmouth, Va., assignor to Allied Chemical & Dye Corporation, New York, N. Y., a corporation of New York No Drawing. Application December 1, 1949, Serial No. 130,602

15 Claims. (Cl. 167—22)

This invention relates to new compositions of matter comprising complex zinc- and silver-ammonia salts of alkenyl succinic acids, useful as fungicides and to methods for preparing such compositions and for combating fungi therewith.

In the past, it has been the practice to control plant-infesting fungi by the application of sulfur-containing, copper-containing and other chemical fungicides.

In my copending application Serial No. 130,601 filed as of even date herewith, there are described, as new compositions of matter having fungicidal properties, the dibasic silver salts of alkenyl succinic acids having from 4 to 24 carbon atoms inclusive in the alkenyl group and a method for combating fungi by applying such compositions to the host.

The dibasic silver salts of alkenyl succinic acids of my copending application referred to above, however, are only slightly soluble in water and hence when used as fungicides must be applied in the form of suspensions, this being inconvenient because of the tendency of the relatively insoluble salts to settle out of suspension. Moreover, when applied in this manner, the silver salts do not adhere strongly to the plant and may be removed by rain or water sprays.

I have now found that the advantageously toxic effects on fungi of the dibasic silver salts of alkenyl succinic acids, as well as of the corresponding zinc salts, are obtained through the use of the new ammonia complexes of these dibasic salts. The complexes are water-soluble solids and aqueous solutions thereof can be sprayed on plants with no separation of fungicide and liquid, whereupon ammonia and water evaporate leaving the insoluble, rain resistant dibasic salt on the foliage. The use of these ammonia complexes therefore offers the twofold advantage of permitting application from aqueous solutions, for example by sprays, and of affording an adherent coating which resists removal by rain to a considerably greater extent than when applied in suspension form. Moreover, I have found, surprisingly, that whereas the dibasic zinc salts of the alkenyl succinic acids show little effectiveness as fungicides when applied as such, they show excellent control of various fungus organisms when applied as the ammonia complexes.

The complex silver- and zinc-ammonia salts of alkenyl succinic acids of my invention have the structural formula set forth below:

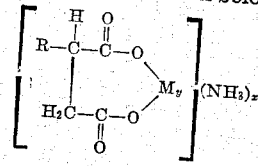

wherein R represents an alkenyl group having from 4 to 24 carbon atoms inclusive, M represents a metal selected from the group consisting of silver and zinc, $y$ represents an integer equal to 1 when M is zinc and 2 when M is silver, and $x$ represents an integer not greater than 6.

The complex ammonia salts illustrated above may be prepared by any suitable process. For example, they may readily be prepared by mixing the corresponding alkenyl succinic acid in an aqueous solution with ammonium hydroxide and a water-soluble silver or zinc salt; or they may be prepared by reacting ammonium hydroxide with the dibasic zinc or silver salt of the corresponding alkenyl succinic acid in aqueous solution.

The dibasic silver salts of the alkenyl succinic acids may be prepared according to my copending application above referred to, by reaction between the corresponding alkenyl succinic acid anhydride and sodium hydroxide to form the dibasic sodium salt, then reacting the dibasic sodium salt with a water-soluble silver salt such as silver nitrate and the dibasic zinc salts may be similarly prepared.

The alkenyl succinic acid anhydrides are readily prepared according to the method described in U. S. Patent 2,411,215 of Mearl A. Kise and Robert F. Engle, by the reaction of maleic anhydride and a cracked distillate fraction containing aliphatic mono-olefins.

The complex zinc-ammonia salts of alkenyl succinic acids are most readily prepared directly from alkenyl succinic acid anhydrides without going through the dibasic sodium and zinc salts as intermediates; that is, by the reaction of water, alkenyl succinic acid anhydride, ammonium hydroxide and a water-soluble zinc salt such as zinc sulfate; the silver-ammonia salt is most readily prepared from the corresponding dibasic silver salt.

In carrying out the preparation of the complex silver ammonia salts of alkenyl succinic acids, according to the preferred method for preparing this salt, the desired dibasic silver salt of alkenyl succinic acid is dissolved in an aqueous solution of ammonium hydroxide at room temperature. The formation of the ammonia complex takes place by simply mixing the reactants at ordinary room temperature (about 25° C.), whereupon the solution may be filtered and may be diluted with water to the particular concentration at which it is to be used as a fungicide.

The zinc-ammonia complex salt is preferably prepared by adding to alkenyl succinic acid anhydride a quantity of water sufficient to hydrate at least about 25% of the anhydride and heating to effect such hydration; the resulting alkenyl succinic acid or preferably a mixture of alkenyl succinic acid and alkenyl succinic acid anhydride is cooled to room temperature (about 25° C.); an ammoniacal zinc solution is prepared by adding to aqueous ammonium hydroxide (for example, containing about 20–30% NH3), a water-soluble zinc salt such as zinc sulfate; and stirring the mixture until solution takes place; to this ammoniacal zinc salt solution, the alkenyl succinic acid-alkenyl succinic acid anhydride mixture described above is added gradually with stirring, over a period of about two hours while the temperature is held at or below normal room temperature (about 25° C.). The mixture is stirred until a clear solution results, containing the complex zinc-ammonia salt of alkenyl succinic acid. This solution may be diluted to the desired concentration for storage or use.

The metal-ammonia complex salts of alkenyl succinic acids of the type contemplated herein are new compositions of matter which are solids at normal room temperature (about 25° C.) and they are all water-soluble to an extent greatly in excess of the concentrations required to effect adequate control of various fungus organisms. The ammonia complexes as such are unstable when exposed to the atmosphere and this characteristic contributes to their usefulness in depositing tightly adhering films of the toxic dibasic metal salts on the leaves and other parts of plants and the like, to be protected from fungus growths. However, in aqueous solutions, the metal-ammonia complexes are amply stable for commercial storage and shipment even at concentrations greatly in excess of that at which they are to be used.

While any single metal-ammonia complex salt of the character described may be used as a fungicide according to my invention, mixtures are contemplated and will generally be used, particularly those prepared from olefins derived from cracked distillates containing mixtures of mono-olefins. In such instances, it is convenient to use fractions or cuts containing the desired predominant number of carbon atoms in the chains; cuts containing predominantly $C_{6-8}$ and $C_{10-12}$ carbon atoms being preferred, and any of the cuts, or mixtures of the whole range or parts thereof, of compound containing from 4 to 24 carbon atoms inclusive are satisfactory.

The following specific examples will illustrate the preparation of the complex ammonia salts. Parts are given by weight.

EXAMPLE 1

90 parts of the dibasic silver salt of a $C_{6-8}$ alkenyl succinic acid (50.43% Ag) was dissolved in 450 parts of an ammonium hydroxide solution (sp. gr. 0.90), whereupon the silver-ammonia complex of alkenyl succinic acid was formed. The solution was filtered and diluted with water to 15 times its weight. The resulting solution was relatively stable at this concentration and even more stable when further diluted.

EXAMPLE 2

With occasional shaking, 172.4 parts of a $C_{10-12}$ alkenyl succinic acid anhydride (neutral equivalent 138) and 3.3 parts of distilled water were heated on a steam bath for one hour to effect partial hydration (about 30%). The resulting solution of alkenyl succinic acids and alkenyl succinic acid anhydrides was cooled to room temperature (25° C.) for use as indicated below. A zinc-ammonia solution was prepared by adding 71.2 parts of $ZnSO_4 \cdot H_2O$ slowly to 328.4 parts of aqueous 22½% ammonium hydroxide solution and stirring until solution was completed. To this solution the alkenyl succinic acid-alkenyl succinic acid anhydride solution described above was added gradually with stirring over a period of two hours while the temperature was held at or below room temperature (25° C.). The mixture was stirred at room temperature until a clear solution resulted indicating the formation of the zinc-ammonia complex of the predominantly $C_{10-12}$ alkenyl succinic acid.

The new silver- and zinc-ammonia complexes of alkenyl succinic acids are effective fungicides against a number of fungus organisms heretofore difficult to control. This activity is obtained by application of solutions containing low concentrations and danger to the plant is not a hazard even with the silver salt at concentration levels sufficient to insure complete control of the organism. This effective fungicidal protection is afforded against early blight of tomatoes by application at concentrations of about 0.05% silver; against snapdragon rust at concentrations of between about 0.0055% and about 0.011% silver; and against late blight of tomatoes at concentrations of about 0.0028% silver in the solution and at slightly higher concentrations of zinc as indicated in Table I below. The new compositions of my invention are particularly valuable for use as water sprays as these two salts are water-soluble and can be sprayed on plants with no separation of fungicide and liquid diluent, whereupon the water and ammonia evaporate leaving the relatively insoluble tightly adherent rain-resistant dibasic salt on the foliage.

The following fungicidal tests were carried out using a water solution of the silver-ammonia complex of a $C_{6-8}$ alkenyl succinic acid and a solution of a zinc-ammonia complex of a $C_{10-12}$ alkenyl succinic acid. In Table I below are listed the amounts of the particular fungicidal preparation in spray solution applied to the plant foliage required to prevent 95% of spore germination (LD-95) of the three fungus organisms:

Table I.—LD-95 (in terms of fungicidal preparation in spray and percent metal (Zn or Ag))

| Material tested | Organism used | | | | | |
| --- | --- | --- | --- | --- | --- | --- |
| | Snapdragon rust | | Tomato early blight | | Tomato late blight | |
| | Percent preparation | Percent metal | Percent preparation | Percent metal | Percent preparation | Percent metal |
| Zn—NH3 complex of $C_{10-12}$ ASA* (prod. of Ex. 2) | 1–2 | 0.047–0.094 | 0.70 | 0.033 | 0.80 | 0.38 |
| Ag—NH3 complex of $C_{6-8}$ ASA* (prod. of Ex. 1) | 1–2 | 0.0055–0.0110 | 10–11 | 0.055–0.061 | .50 | .0028 |

*Alkenyl succinic acid.

The relative rain resistance of spray applications made with complexes and with the dibasic metal salts is indicated by data using the zinc salts as illustrative, listed in Table II below, which were obtained as follows.

Two leaves from the *Primula obconica* were sprayed on the top surface with a suspension of the dibasic zinc salt of $C_{10-12}$ alkenyl succinic acid in water and two other leaves from the same plant were sprayed with an aqueous solution of the amine of this salt. Metal concentration was equal in each spray and each leaf received about the same amount of spray. The spray was dried on the leaves at room temperature and after several hours each leaf was divided into two parts and surface areas were measured. One half of each leaf was sprayed in a "Weather-O-Meter" with water equivalent to one inch of a driving rainfall. The weight of metal on the leached and unleached portions of the leaves was then determined by quantitative spectographic analyses. The concentration of metal per square inch of leaf surface was calculated and a statistical examination of the data was made to compare the water resistance. The data obtained are tabulated in Table II below:

Table II.—*Leaching of Zn salt of $C_{10-12}$ alkenyl succinic acid from plants*

|  | $NH_3$ complex salt, mg. metal/in.² leaf surface | Regular salt, mg. metal/in.² leaf surface |
| --- | --- | --- |
| Not washed | 0.0156 | 0.0205 |
| Washed | .0083 | .0116 |
|  | .0133 | .0055 |
|  | .0113 | .0045 |

These data show that the dibasic metal salts of the alkenyl succinic acids deposited from solutions of the complex metal-ammonia compounds are significantly more resistant to removal by water leaching, and hence more rain resistant than when deposited from suspensions of the dibasic metal salts.

I claim:

1. As new compositions of matter, the complex metal-ammonia salts of alkenyl succinic acids selected from the group consisting of compounds having the following general formulas

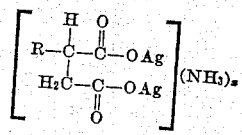

and

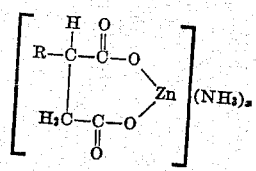

wherein R represents an alkenyl group having from 4 to 24 carbon atoms inclusive, and $x$ represents an integer not greater than 6.

2. The composition of claim 1 wherein the metal is zinc.

3. The composition of claim 1 wherein the metal is silver.

4. As a new composition of matter, a mixture of complex silver-ammonia salts of alkenyl succinic salts having the following formula

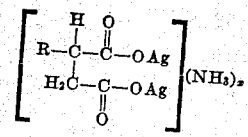

wherein R represents a plurality of alkenyl groups containing predominantly from 6 to 8 carbon atoms and $x$ represents an integer not greater than 6.

5. As a new composition of matter, a mixture of complex zinc-ammonia salts of alkenyl succinic acids having the following general formula

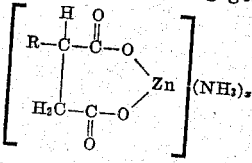

wherein R represents a plurality of alkenyl groups containing predominantly from 10 to 12 carbon atoms and $x$ represents an integer not greater than 6.

6. In a process for preparing complex metal-ammonia salts of alkenyl succinic acids selected from the group consisting of compounds having the following general formulas

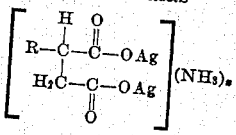

and

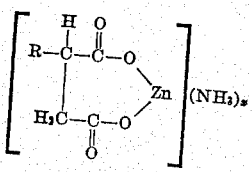

wherein R represents an alkenyl group having from 4 to 24 carbon atoms inclusive, and $x$ represents an integer not greater than 6, the step which comprises reacting ammonia in aqueous solution with a compound which provides an alkenyl succinic acid radical and a metal ion selected from the group consisting of silver ions and zinc ions.

7. In a process for preparing complex metal-ammonia salts of alkenyl succinic acids selected from the group consisting of compounds having the following general formulas

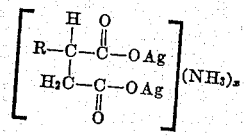

and

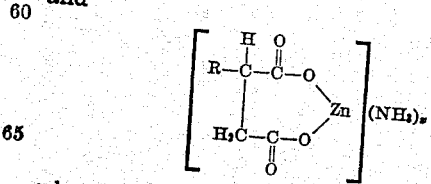

wherein R represents an alkenyl group having from 4 to 24 carbon atoms inclusive, and $x$ represents an integer not greater than 6, the step which comprises mixing the corresponding dibasic metal salt of the alkenyl succinic acid with aqueous ammonium hydroxide.

8. The method of claim 7 wherein the metal is silver.

9. The method according to claim 7 wherein

R represents a plurality of alkenyl groups containing predominantly from 6 to 8 carbon atoms.

10. In a process for preparing complex metal-ammonia salts of alkenyl succinic acids selected from the group consisting of compounds having the following general formulas

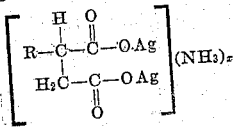

and

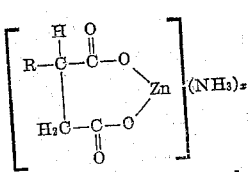

wherein R represents an alkenyl group having from 4 to 24 carbon atoms inclusive, and $x$ represents an integer not greater than 6, the steps which comprise (a) mixing the corresponding alkenyl succinic acid anhydride with water, (b) heating to effect partial hydration thereof whereby a mixture of alkenyl succinic acid and alkenyl succinic acid anhydride is formed, (c) adding to the mixture thus formed an ammoniacal solution of a metal selected from the group consisting of silver and zinc prepared by mixing ammonium hydroxide with a water-soluble salt of one of said metals, and (d) agitating the mixture until the reaction is complete.

11. The method of claim 10 wherein the metal is zinc.

12. The method according to claim 10 wherein R represents a plurality of alkenyl groups containing predominantly from 10 to 12 carbon atoms.

13. A process for combating fungi on plants, which comprises applying to the plant a compound selected from the group consisting of compounds having the general formulas

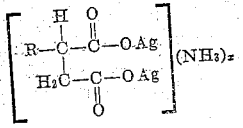

and

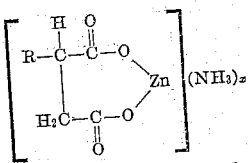

wherein R represents an alkenyl group having from 4 to 24 carbon atoms inclusive, and $x$ represents an integer not greater than 6.

14. A process for combating fungi on plants, which comprises spraying the plant with an aqueous solution containing a compound selected from the group consisting of compounds having the general formulas

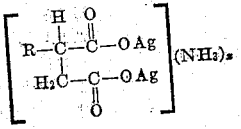

and

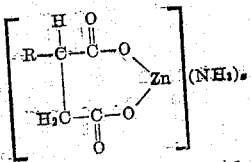

wherein R represents an alkenyl group having from 4 to 24 carbon atoms inclusive, and $x$ represents an integer not greater than 6, exposing the plants to the atmosphere whereby the complex ammonia salt decomposes, leaving a tightly adhering rain resistant coating of the corresponding dibasic metal salt on the plant.

15. A process for combating fungoid blight of tomato plants which comprises applying to the leaf surfaces of the tomato plant, an aqueous solution of an ammonia complex of a dibasic metal salt of a metal of the group consisting of silver and zinc, and an alkenyl succinic acid containing from 4 to 24 carbon atoms, inclusive, in the alkenyl group, wherein the molecular ratio of ammonia to alkenyl succinic acid salt in the complex is at least one and not more than 6.

MEARL A. KISE.

References Cited in the file of this patent

UNITED STATES PATENTS

| Number | Name | Date |
|---|---|---|
| 1,510,358 | Vandevoorde | Sept. 30, 1924 |
| 1,589,644 | Hedenburg | June 22, 1926 |
| 1,853,397 | Banks | Apr. 12, 1932 |
| 2,157,727 | Baker | May 9, 1939 |
| 2,360,426 | Kyrides | Oct. 17, 1944 |
| 2,380,699 | Kyrides | July 31, 1945 |
| 2,381,852 | Hochwalt | Aug. 7, 1945 |
| 2,490,958 | Graenacher et al. | Dec. 13, 1949 |
| 2,547,261 | Geiger | Apr. 3, 1951 |

OTHER REFERENCES

Beilstein: 2 Band, 4 Auflage, page 607.

Ber., vol. 5, January-June 1872, pages 30-31.

American Chem. Journ., vol. 39, January-June 1908, pages 201-203.

Dimond et al.: Rept. Fungicide Sub-committee Am. Phytopathological Soc.; Conn. Agr. Expt. Sta., Mimeo Pub., June 22, 1942, pp. 1, 2, and 4.

Frear, Chemistry of Insecticides, Fungicides, and Herbicides, 2nd edition, 1948, D. Van Nostrand, N. Y., p. 255.